United States Patent
Anderson et al.

(10) Patent No.: US 6,549,829 B1
(45) Date of Patent: Apr. 15, 2003

(54) SKIPPING FILTER FOR INERTIALLY AUGMENTED LANDING SYSTEM

(75) Inventors: Leonard R. Anderson, Lynnwood, WA (US); Steven B. Krogh, Issaquah, WA (US); Melville D. McIntyre, Bellevue, WA (US); Timothy Murphy, Lynnwood, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/001,077

(22) Filed: Oct. 31, 2001

(51) Int. Cl.[7] .............................. G01S 5/02; H07B 7/185
(52) U.S. Cl. .................. 701/16; 701/214; 701/215; 701/216; 342/357; 342/357.06; 342/357.14; 244/183; 244/184; 244/194; 244/195
(58) Field of Search ................ 701/16, 213, 214, 701/215, 216; 342/357, 13, 357.14, 357.06, 358; 340/972; 244/183–189, 194–195, 81

(56) References Cited

U.S. PATENT DOCUMENTS

| | | | | |
|---|---|---|---|---|
| 5,820,080 A | * | 10/1998 | Eschenbach | 244/183 |
| 5,831,575 A | * | 11/1998 | Gu | 342/357 |
| 5,969,672 A | * | 10/1999 | Brenner | 342/357.06 |
| 6,178,363 B1 | | 1/2001 | McIntyre et al. | 701/16 |
| 2001/0020214 A1 | * | 9/2001 | Brenner | 701/213 |

OTHER PUBLICATIONS

"Functional Development of the 757/767 Digital Cat. IIIB Autoland System", Dwight R. Schaeffer, 1983, pp 1–15, Seattle, Washington.

"Functional Development of the 757/767 Digital cat. IIIB Autoland System", AIAA Paper 83–2192, pp. 1–15, Dwight R. Schaeffer, published Jan. 01, 1983.

* cited by examiner

Primary Examiner—Thomas G. Black
Assistant Examiner—Tuan C To
(74) Attorney, Agent, or Firm—Conrad O. Gardner

(57) ABSTRACT

The present method and apparatus consists of storing past values of estimated IRU error and using these past values to update the coasting filter when switching from GPS to inertial mode. Through the storage of past IRU error estimates, it is possible to avoid misdirected guidance from an erroneous GPS signal. The MMR and ground station can require up to 6 seconds to identify a failed GLS signal.

13 Claims, 2 Drawing Sheets

SKIPPING FILTER FOR INERTIALLY AUGMENTED LANDING SYSTEM

TECHNICAL FIELD

This invention relates to inertially augmented landing systems and more particularly methods and apparatus for overcoming delays in detection of GLS input signal errors essential to safe guidance in landing and rollout of an aircraft.

BACKGROUND OF THE INVENTION

Since 1993, the industry has been working to develop automatic landing capability using differential GPS. This capability is known as the GNSS Landing System GLS). GLS developments to support CAT 1 operations are nearly complete. The industry is now working on standards and performance requirements for GLS to support CAT II/III operations. A key issue associated with GLS CAT II/III operations is the expected failure modes and effects of the GLS guidance system. It is anticipated that the most common failure mode for GLS will be a total loss of the signal for hundreds of seconds. U.S. Pat. No. 6,178,363B1 shows a GPS/Inertial filtering scheme to enable the airplane to continue to land and roll out after a total loss of GLS guidance below the alert height.

Key to this concept is the ability of the GLS groundstation to provide the aircraft systems with the information required to determine with certainty when the GLS guidance signals are unusable. The airborne multi-mode receiver (MMR) must respond rapidly to switch away from the faulty GLS signals to updated inertial guidance in order to prevent the inertial signals from becoming corrupted by the errors in the GLS signals. Unfortunately, the GLS groundstation cannot communicate the status of the guidance signals instantaneously, and therefore the likelihood of corruption exists. Accordingly, the present method and apparatus as hereinafter described address this problem.

SUMMARY OF THE INVENTION

During a failure condition, it is possible for a differential GPS ground station to provide corrupted data for up to 3 seconds before raising an alarm. Furthermore, the airplane is allowed to continue to use the last data provided by the ground station for up to 3.5 seconds after the ground station stops transmitting data. Consequently, there could be a 3–6 second delay between GPS signal corruption and detection of the corruption by the airborne receiver. The present invention provides a means for correcting the integrated GPS/INS solution and protecting the airplane landing performance from any effects due to this potential for data corruption. A skipping filter in combination with a coasting filter shown in U.S. Pat. No. 6,178,363B1 enables recovery from up to 6 seconds of corrupted GPS signal, thereby avoiding subsequent missguidance from the anomalous GPS signal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Preferred Embodiment

Due to the requirements on the Ground Based Augmentation System (i.e., the differential GPS ground station supporting the GLS function) the detection of an anomalous GPS position or GPS velocity signal could require from 3 to 6 seconds. Consequently, the coasting filter is potentially exposed to up to 6 seconds of an error in progress before the guidance signal is flagged. Once the GPS anomaly is detected, the coasting filter switches to pure inertial guidance mode. However, due to this 3–6 second lag time to alarm, the landing guidance signal may be corrupted. It is necessary to find a means of avoiding guidance corruption due to the delay in GPS fault detection.

The solution to this problem is the hereinafter described signal skipping filter which separates the inertial guidance signal from the GPS guidance signal, and therefore avoids corruption caused by the delayed detection of the GLS signal loss.

Figure 1:
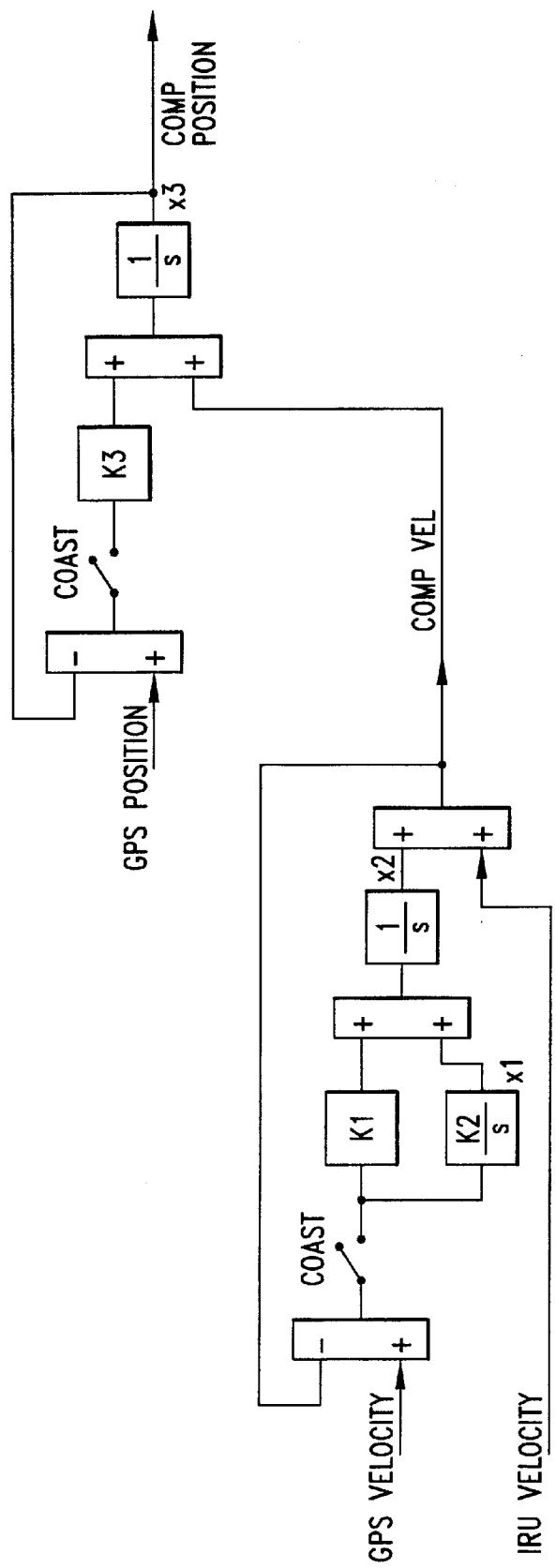
FIG. 1 is a block diagram of a coasting filter as shown in U.S. Pat. No. 6,178,363B1 issued Jan. 23, 2001 to McIntyre et al. and assigned to The Boeing Company.

The coasting filter of FIG. 1 is shown in U.S. Pat. No. 6,178,363B1. The coasting filter of FIG. 1 receives GLS (differential GPS) position and velocity signals as shown. These high accuracy signals are used to identify the bias and bias-rate in the IRU (Inertial Reference Unit) velocity signal, shown. At the time of loss of GPS signal, the two switches go to open or "coast" position and the aircraft landing guidance is completed with IRU guidance alone. The IRU velocity and acceleration biases are estimated by integrator outputs x1 and x2. The IRU position offset is estimated by the output of integrator x3. The bias values for IRU velocity and acceleration are slowly varying quantities. They can be estimated with high accuracy (limited by the accuracy of GLS signals) during two or more minutes of landing approach. The IRU velocity and acceleration bias values are thus estimated for the subsequent coasting interval which can be up to one minute in duration.

Figure 2:
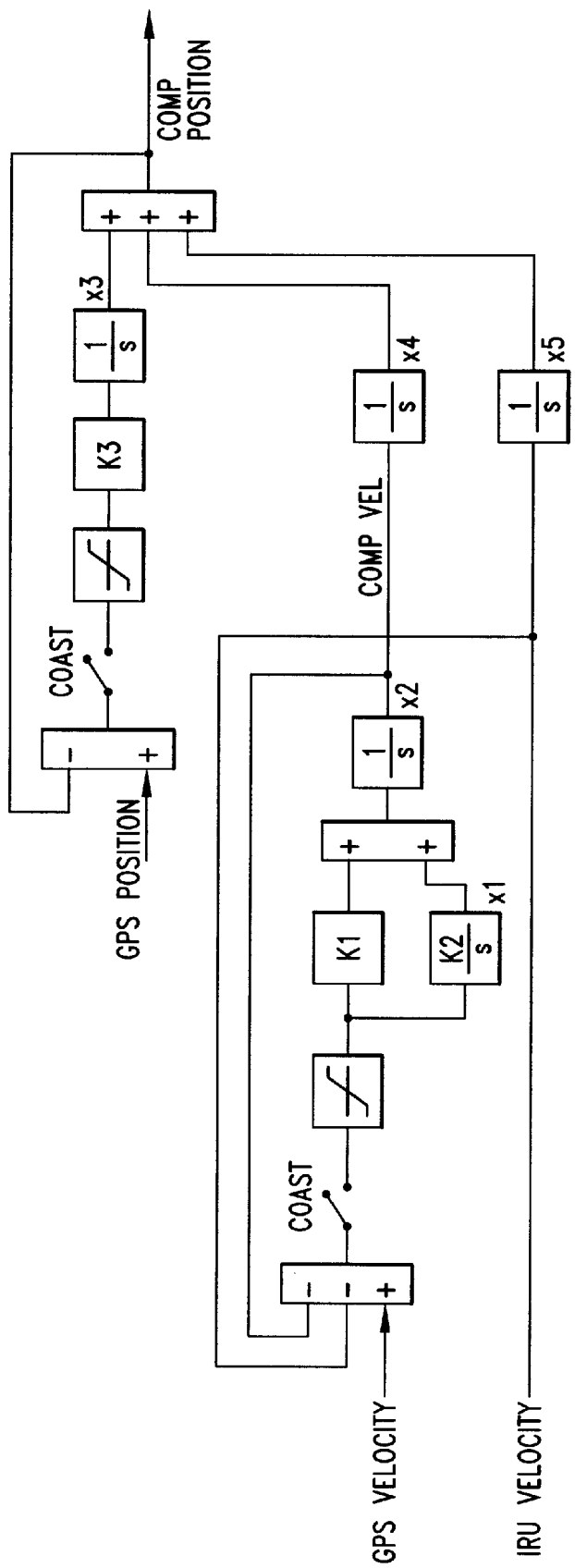
FIG. 2 is a block diagram of a preferred embodiment of the present combination coasting filter and skipping filter.

Due to the time delay to alarm of the ground station, the coasting filter may be exposed to several seconds of corrupted GPS input before detection. In this case, after the switch to inertial mode, the complementary velocity and complementary position would have been corrupted and would therefore yield reduced accuracy guidance. The skipping filter of FIG. 2 is directed to a solution for overcoming this problem.

The general concept of the present skipping filter is as follows: The states of the filters (along with any filter inputs if necessary;) are stored in a time buffer for 6 seconds. When the GLS guidance signal is lost and the switches are set to the "coast" position the filter states are reset to the states from N seconds prior. Then the filter states are propagated forward in time by applying the filter information recorded over the last N seconds. In this manner, any corruption of the filter state due to GLS guidance failures in progress will be removed. The time period N depends on the exact conditions causing the coast mode to be entered.

A specific embodiment of the present skipping filter comprises a complementary filter. The skipping filter may be applied to any linear state space filter (including a Kalman Filter) implementation.

With the addition of two integrators it is possible to avoid corruption of the IRU guidance signal. Also, in order to avoid any unwanted effects of the anomalous 3–6 second GPS signal (either position or velocity), at the time coasting filter switches to inertial mode, the integrators x1, x2, x3, x4 are reset with stored values as follows: Assume the delayed signal detection interval is Δt seconds, and the values of the integrators just before the corrupted GLS signal are x1old, x2old, x3old and x4old. These old values of integrator outputs would be stored in MMR memory (up to 6 seconds). The current integrator values at the time of failure detection are x1now, x2now, x3now. When a GPS anomaly is detected the delay, Δt, will be estimated based on the failure mode. The velocity bias rate estimator x1 is replaced with the before-corruption value x1old. The velocity bias estimator x2 is replaced with the before-corruption value x2old+Δt x1old, and the "position-effect-of-velocity-bias" integrator x4 is replaced with the value x4old+Δt (x2old+Δt x 1old/2). The position bias estimator x3 is replaced with the before-corruption value x3old.

The IRU velocity/position information at integrator x5 is uncorrupted by the GLS signal fault and can be used without change.

It can thus be seen that the present skipping filter method allows the guidance error to recover immediately to its low pre-fault value with minor increase in filter complexity. This improvement in guidance accuracy is provided through utilization of two additional integrators and storage of a few values for integrators x1, x2 and x3.

In addition to recovering best estimates of IRU bias values when the coasting filter switches to coast mode, limiters are placed on the difference between GLS and IRU position/velocity to minimize temporary misguidance during delayed error detection. The error limiting is performed by the two limiters shown in FIG. 2. The error limit values will be chosen so that the required MMR guidance accuracy is achieved without interfering with normal mode filter operation.

The present skipping filter has been tested in simulations with the result that whereas a 6-second uncorrected delay in detecting GLS signal faults can increase final lateral position error on the runway from 23 ft rms to 42 ft rms, the hereinbefore described skipping filter allows the recovery of guidance accuracy to a 24 ft rms level.

The present improvement to the MMR (Multi-Mode Receiver) with GLS (differential GPS) will improve the availability of the aircraft landing system in the event of loss of GPS signal.

While the preferred embodiment of the invention has been illustrated and described, it will be appreciated that various changes can be made therein without departing from the spirit and scope of the invention.

What is claimed is:

1. In combination in an inertially augmented landing system:
   a coasting filter comprising a GPSA inertial complementary filter; and,
   a skipping filter; and,
   said skipping filter comprising a complementary filter including two integrators for separating an inertial guidance signal from a GPS guidance signal thereby avoiding corruption for the delayed detection of a GLS signal loss.

2. A method for utilizing a skipping filter comprising the steps of:
   storing past values of estimated IRU error; and then
   utilizing said stored past values of estimated IRU error to update a coasting filter comprising a GPS inertial complementary filter when switching from GPS to inertial mode.

3. In combination in an inertially augmented GPS landing system:
   means for storing a running record of the GPS and inertial states of an aircraft, such record containing the GPS and inertial state data measured during the most recent 6 second window of time; and
   means to estimate the inertial state errors in the event of a GPS signal failure, utilizing the data stored in the 6 seconds prior to detection of the failure.

4. The invention according to claim 3 wherein said running record is 6 seconds long.

5. A method for correcting the corruption of the inertial state error estimates caused by a faulty GPS signal comprising the steps of:
   detecting a GPS signal failure, which can take up to 6 seconds from the instant of failure; and, then,
   rapidly replaying in non-real time the prior 6 seconds of inertial data through a coasting filter comprising a GPS-inertial complementary filter, but this time with the filter switched to the inertial-only mode skipping filter, so as to avoid the corruption of the inertial state error estimates; and,
   continuing the approach with uncorrupted inertial state error estimates yielding accurate subsequent guidance of the aircraft.

6. In combination in an inertially augmented landing system:
   coasting filter comprising a GPS-inertial complementary filter; and,
   a skipping filter, said skipping filter being a non-real time implementation of the coasting filter switched to inertial-only mode and comprising two integrators for replaying the prior 6 seconds of inertial state data with uncorrupted inertial state error estimates.

7. A method for utilizing a skipping filter comprising the steps of:
   storing past values of IRU inertial state data: and, then,
   utilizing said stored past values of IRU state data to update a coasting filter comprising a GPS inertial complementary filter when switching from blended GPS-inertial mode to inertial-only mode.

8. In combination in an inertially augmented GPS landing system:
   means for storing a running record of the GPS and inertial states of an aircraft, such record containing the GPS and inertial state data measured during the most recent 6 second window of time; and
   means to estimate the current error-free aircraft state in the event of a GPS signal failure, utilizing the data stored in the 6 seconds prior to detection of the failure.

9. The invention according to claim 8 wherein said running record is 6 seconds long.

10. A method for correcting the corruption of the inertial state error estimates caused by a faulty GPS signal comprising the steps of:
    detecting a GPS signal failure, which can take up to 6 seconds from the instant of failure; and, then,
    rapidly replaying in non-real time the prior 6 seconds of inertial data through a coasting filter comprising a coasting filter, but this time with the filter switched to the inertial-only mode skipping filter, so as to avoid the corruption of the inertial state error estimates; and,
    continuing the approach with uncorrupted inertial state error estimates yielding accurate subsequent guidance of the aircraft.

11. In combination in an inertially augmented landing system:
   a coasting filter comprising a coasting filter; and,
   a skipping filter, said skipping filter being a non-real time implementation of the coasting filter switched to inertial-only mode and comprising two integrators for replaying the prior 6 seconds of inertial state data with uncorrupted inertial state error estimates.

12. A method for utilizing a skipping filter comprising the steps of:
   storing past values of IRU inertial state data: and, then,
   utilizing said stored past values of IRU state data to update a coasting filter comprising a GPS inertial complementary filter when switching from blended GPS-inertial mode to inertial-only mode.

13. A method for avoiding landing guidance signal corruption due to delay in GPS fault detection comprising the steps of:
   providing a signal skipping filter; and then,
   utilizing said signal skipping filter to separate the inertial guidance signal from the GPS guidance signal thereby avoiding corruption caused by the delayed detection of the GLS signal loss.

* * * * *